April 25, 1933. J. STOECKLIN 1,905,609

DISTANCE RELAY FOR ELECTRIC LINES

Filed July 2, 1928

JOSEF STOECKLIN
INVENTOR

By Marks & Clerk.
Attys.

Patented Apr. 25, 1933

1,905,609

UNITED STATES PATENT OFFICE

JOSEF STOECKLIN, OF ZURICH, SWITZERLAND, ASSIGNOR TO AKTIENGESELLSCHAFT BROWN, BOVERI AND CIE., OF BADEN, SWITZERLAND

DISTANCE RELAY FOR ELECTRIC LINES

Application filed July 2, 1928, Serial No. 289,816, and in Germany July 7, 1927.

This invention relates to protective relays for alternating current transmission lines known as distance relays, which embody a cross coil instrument on the principle of an ohmmeter, the direction of deflection of which is made dependent on the relative position of the relay with respect to the sources of power and a fault (a short circuit) and the amount of deflection of which is arranged to give an indication of the distance of the relay to the fault by coacting with a time release mechanism. Characteristic of such instruments is the delay period between the start of operation and the moment of disconnecting the line determined by the amount of rotation of the pointer spindle of the ohmmeter. The start of operation of such a relay is brought about when the impedance of the line drops below a certain amount. Since the inductance of transmission lines is a function of the length it has been proposed to make the ohmmeter deflection measure chiefly the line reactance rather than the line resistance or impedance. The torque on the ohmmeter is then dependent upon a reactive component and in certain circumstances this may be insufficient to deflect in the correct direction corresponding to the position of the fault the index member on the spindle of the ohmmeter which coacts with the time release mechanism, and the use of the resistance component for this purpose is precluded by the employment of the reactive component for the measurement of distance.

According to the present invention this disadvantage is overcome by introducing a resistance component temporarily for a period of time between the start of operation of the relay and the moment of disconnecting the line.

The invention will be described with reference to the accompanying drawing wherein.

Figure 2:
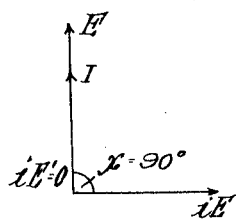
Figures 2, 3 and 4 are vector diagrams to make clearer the changes of phase.

For the moment neglecting the effect of the contact switch $e$, i. e. considering the choke $d$ permanently in the circuit of the voltage coil, in known selective relays the two coils of the ohmmeter $b$ are rigidly secured on their shaft so that they always make an angle of for instance 90° with one another, and move in a magnetic field energized by the current in the series coil $k$. Alternatively the coils could be stationary and a series energized magnet be connected with the shaft. The coil $a$ of the ohmmeter is connected to a current transformer $r$ and the coil $f$ to a voltage transformer $q$ through a choke coil $d$ which transmits the voltage E.

Upon the occurrence of a defect, the clockwork motor $m$ is set into operation by separate coils acting upon the device $u$ which clockwork drives the time element $h$ about the axis $v$ as pivot, at a uniform speed by means of the toothed wheel L' and toothed segment L. If the member $g$ rotates in an anticlockwise direction the pin $n$ of the time element $h$ enters the slot $s$ of the index member $g$ and moves, when the index member $g$ is moving into its position corresponding to the line reactance from the left hand towards the right hand side of the slot $s$. As soon as the index member $g$ comes to rest the pin ceases to move along the slot, its knife edge $n$ abuts on the toothed rim $t$ and becomes the axis of rotation of the time element $h$, which then rocks, being still driven by the clockwork, so that its lower extremity $x$ comes against the releasing contacts $o$ and $p$, the slot $w$ slipping over the pivot $v$. Closure of the contacts $o$ and $p$ causes the release of the associated main switch.

If the member $g$ rotates in a clockwise direction corresponding to a flow of energy in the opposite direction the knife edge $n$ does not enter the groove of the member $g$ but eventually abuts on the circular rim adjacent to the spindle and thus trips out the line after a fixed time. The relay being selective, the delay period indicates the distance of the fault only for one direction of flow of energy. It is found however that the torque on the ohmmeter shaft, owing to the reactance character of the phase angle difference between the associated coils and to the additional impedance given by the inductance $d$, may be insufficient to rotate the member $g$ at such speed in the time available that the direction of flow of energy shall be infallibly indicated according to whether the pin $n$ enters the slot $s$ or proceeds towards the spindle independently of the slot.

On a short-circuit occurring in a network close to the point of connection of a distance relay of the kind described, the voltage at the terminals of the voltage system is very small. Even if the short-circuit should be of the nature of an arc with an appreciable voltage drop the distinction between the directions in a distance relay connected up permanently as a reactance relay would be uncertain, as only the inductive component of the voltage drop in the short-circuit loop in front of the relay would be effective in the latter.

The present invention consists in a distance relay for electric lines in which the direction of energy and delay period is determined by the position of the pointer member of an ohmmeter, which pointer coacts with a time delay member for making contact, characterized by the feature that the phase position of the current in the voltage coil is changed with respect to the line voltage during the time delay period.

According to the present invention $f$ is the voltage coil of the ohmmeter $b$, which by having an ohmic resistance $c$ connected in parallel with it and the choking coil $d$ connected in series with it, is so arranged that the current in the coil $f$ is displaced through 90° with respect to the line voltage E. $a$ is the current coil of the ohmmeter and $e$ a switch for short-circuiting the choking coil $d$. When the switch $e$ is open the ohmmeter reacts only to inductance and is consequently a reactance meter. $g$ is the pointer system which is displaced by the crossed coil instrument $b$, and $h$ the time delay elements which are driven by the clockwork $m$. On the rotary shaft of the clockwork $m$ the disc $i$ is mounted, acting as a cam.

In order to obtain an ohmic component with arc resistance faults the switch $e$ remains closed until the energy direction has been clearly indicated by the direction of rotation of $g$ and the consequent proper motion relative to the lever member $h$. This causes the phase displacement due to the resistance $c$ and the choking coil $d$ to become ineffective. The displacement between the current in the voltage coil $f$ and the line voltage will then be less than 90° and the ohmmeter will tend to measure a certain ohmic component according to the remaining phase displacement angle of the ohmmeter voltage coil. At the same time whilst the choking coil $d$ is short-circuited, the voltage coil $f$ receives a greater current and in consequence the ohmmeter torque is greater.

This state is maintained until the upper end of the time element $h$ faces the curved gap in the member $g$. Assuming the direction of the energy to be correct for the operation of the relay under control of the slot in the member $g$, the disc $i$ opens the switch $e$, re-establishes thereby the additional phase displacement through the resistance and the choking coil and the relay adjusts its time of release according to the reactance.

This change of the measuring position fulfills a further purpose. As is well known network transformers show angular errors which may assume considerable values, more particularly in the case of ring type current transformers. The magnitude of this angular error may vary according to the magnitude of the current flowing through and may be positive or negative according to the load. If a relay which is dependent on pure reactance be connected to such a current transformer, the angular error may, assuming a pure ohmic measuring resistance, produce a deflection in the opposite direction to that corresponding to the actual direction of flow of energy.

By suitably dimensioning the ohmmeter the measuring position, with the short-circuit switch closed, may be so selected for the choking coil that independently of the transformer error the direction of the ohmmeter deflection will correctly indicate the direction of flow of energy.

A set of selective relays with current and voltage transformers is inserted at both ends of the section of the network which is to be protected by the relays. The closer the point of insertion of the relay lies to the defect in the line, the smaller is the angle through which the system $b$ rotates and the more rapidly is the selective relay released. The selective relay first released disconnects the defective section of the line, so that the other selective relays prior to the release of their associated switches return into the "ready" position.

Figure 3:
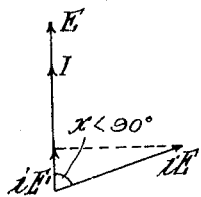

In Figures 2 and 3, I is the resistance component of the current in the current coil of the ohmmeter, in phase with E the voltage in the secondary of the transformer $q$, which voltage produces a current $i_E$ in the voltage coil of the ohmmeter. $i_E'$ is the component of $i_E$ in phase with E and I, and $\psi$ the angle it makes with E and I.

In Figure 2, the switch $e$ is open and it will be seen that since the resistance component of the current is at right angles to $i_E$, the said component can have no effect on the torque. If the reactance component is small, the relay may fail to indicate correctly the relative position of the short circuit.

In Figure 3 the switch $e$ is closed and it will be seen that the torque will be increased owing to the component $i_E'$, of $i_E$ which is in phase with I.

These two cases correspond to the insertion and withdrawal from circuit of the choke $d$ with its consequent effect on the lag of the current in the voltage coil.

Figure 4:
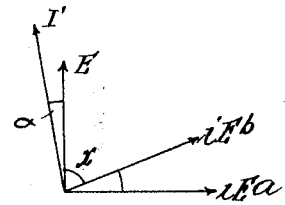
Figure 1:
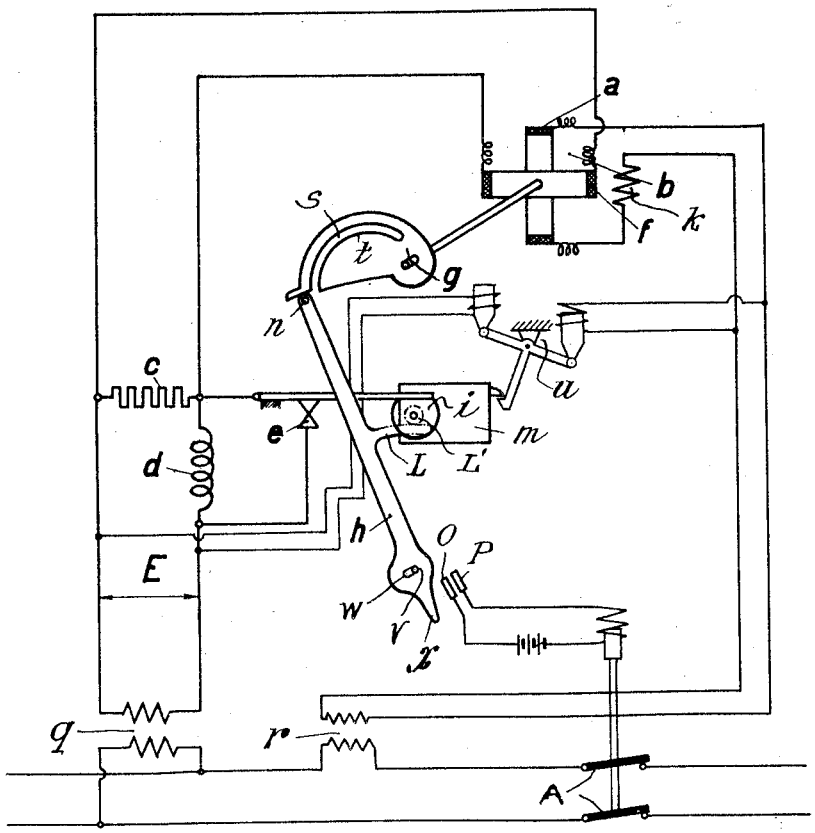
Figure 1 represents diagrammatically a distance relay.

In Figure 4, E as before is the voltage in the secondary of the transformer $q$, which latter however is supposed to have a phase error $\alpha$ such that the resistance component of the current in the current coil leads the voltage E by the angle $\alpha$.

$i_{Ea}$ is the current in the voltage coil when the switch $e$ is open.

For small values of the reactance component the torque may be in the reverse direction to the correct indication, since the angle between I' and $i_{Ea}$ is obtuse.

When the switch $e$ is closed, the current in the voltage coil is advanced to $i_{Eb}$, and the advancement is made sufficient for the correct direction indication to be given, which will happen if the angle I' and $i_{Eb}$ is acute.

Having now described my invention what I claim as new and desire to secure by Letters Patent is:—

1. In a protective system for alternating current transmission lines, a protective device containing in combination transformers whose primary windings are connected to the line respectively in series and parallel, connections from the secondary windings of said transformers to the coils of an ohmmeter, a winding in series with one of said coils for producing the field of the ohmmeter, a choke coil in series with the other of said coils, a slotted member on a rotatable shaft which latter carries the said coils, a clockwork mechanism and a pivoted lever adapted to be rotated by the mechanism, said lever coacting with said slotted member and adapted to abut on selective points on the latter and to slide on its pivot and in so doing to close a switch, means for disconnecting the transmission lines on the closing of said switch, means for setting in motion the clockwork mechanism in dependence on the line impedance, said protective device being provided with means for changing the phase of the current in one of the coils of the ohmmeter during the movement of the clockwork.

2. In a protective system, a protective device, as claimed in claim 1, wherein the means for changing the phase of the said current comprises a contact switch connected in shunt across the said choke coil, and means for operating the switch.

3. In a protective system, a protective device as claimed in claim 1, wherein the means for changing the phase of the said current comprises a contact switch connected in shunt across the said choke coil, a lever member for said contact switch and a cam member operated by said clockwork mechanism and coacting with said lever member.

In testimony whereof I have signed my name to this specification.

JOSEF STOECKLIN.